United States Patent [19]

Slavin et al.

[11] 4,005,821
[45] Feb. 1, 1977

[54] THERMOMECHANICAL VACUUM REGULATOR USING BIMETALLIC POSITION SENSING

[75] Inventors: Michael Slavin, Gloucester Point; George T. Bata, Grafton; Raymen F. Emery, Yorktown, all of Va.; George C. Ludwig, Troy, Mich.

[73] Assignee: The Bendix Corporation, Southfield, Mich.

[22] Filed: Apr. 10, 1975

[21] Appl. No.: 566,869

[52] U.S. Cl. .......................... 236/87; 137/596.18; 236/80 E; 236/101 E
[51] Int. Cl.² ................. G05D 23/275; B60H 1/02
[58] Field of Search ............... 236/87, 88, 101, 99, 236/80; 137/596.18, 627.5

[56] References Cited

UNITED STATES PATENTS

| | | | |
|---|---|---|---|
| 2,280,345 | 4/1942 | Nickells | 236/87 |
| 2,285,513 | 6/1942 | Harris | 236/87 X |
| 3,294,320 | 12/1966 | Franz | 236/87 |
| 3,476,316 | 11/1969 | Franz | 236/87 X |
| 3,770,195 | 11/1973 | Franz | 236/87 X |

*Primary Examiner*—William E. Wayner
*Attorney, Agent, or Firm*—W. G. Christoforo; Bruce L. Lamb

[57] ABSTRACT

A thermomechanical vacuum regulator adapted for use in automatic temperature control systems includes a bimetal strip which flexes in accordance with the temperature of air stream whose temperature is to be controlled. The bimetal strip positions a whiffle tree beam which carries a vacuum valve for communicating a source of vacuum with a chamber within which vacuum is regulated, and a vent valve for communicating the chamber with a source of ambient air. The vent valve seat is located on a floating diaphragm which forms one wall of the chamber. In alternative embodiments, one of the valves is replaced by an orifice and column.

14 Claims, 7 Drawing Figures

THERMOMECHANICAL VACUUM REGULATOR USING BIMETALLIC POSITION SENSING

BACKGROUND OF THE INVENTION

This invention relates to thermomechanical vacuum regulators which are adapted for use in automotive automatic temperature control systems. The invention more particularly relates to a vacuum regulator which produces a vacuum in accordance with the temperature of an air stream through the use of a bimetal strip.

As well known to those skilled in the art, it has been common to mix heated air and cool air in such proportions in an automotive vehicle with the help of an air mix damper or blend door so that the mixture of such air is at the temperature set by the vehicle operator. It has also been common to use a vacuum powered motor to position the blend door to produce the desired mixture of air. The means for controlling the vacuum motor have comprised vacuum regulators, certain of which operate in accordance with thermomechanical principles whereby a bimetal element suspended in the air whose temperature is to be controlled in turn controls the degree of vacuum communicated to the vacuum motor. These vacuum regulators have included a means for communicating ambient air to a chamber in which the controlled vacuum is produced and which in turn is freely communicated with the vacuum motor. The vacuum regulators have also included means which communicate a source of vacuum, suitably the engine manifold, with the chamber. Feedback means are also known, usually in the form of a floating diaphragm which cooperates with the above mentioned means, to permit the regulated vacuum to be fed back into the vacuum regulator servo system. In essence, the conversion between temperature of the bimetal element and the vacuum output from the vacuum regulator is achieved by balancing the forces between the vacuum feedback diaphragm of the regulator and the bimetal element to control the vacuum and vent means. In a typical vacuum regulator of this prior art type, the vent and vacuum means, usually valves, are arranged colinearly with the line of action through which the feedback diaphragm and bimetal element forces operate. The inherent difficulty with this type of system is that the forces tending to produce the regulated vacuum decrease asymptotically as the vacuum reaches its proper level since the forces that position the diaphragm and the valving are colinear. In addition, the bimetal element is under stress from the load of the feedback diaphragm for long periods of time and thus overall accuracy of the bimetal is affected with time. Another difficulty with this prior art system is that the response time of the system after an unbalance of the system occurs is limited by the amount that the valves are open since the bimetal element must divide its output force and motion between the feedback diaphragm and the opening of the valves.

The present invention overcomes the disadvantages found in the use of the prior art thermomechanical vacuum regulators using bimetal elements by the use of position sensing of the bimetal element and by positioning a servo follower valve in response to the position of the bimetal element. This mode of operation presents practically no force reaction to the bimetal element and allows it to stroke in accordance with its temperature. A vacuum regulator built in accordance with the principles of this invention will provide wider valve openings and thus faster correction of an unbalanced system.

One embodiment of the thermomechanical vacuum regulator to be described is a zero leakage device which will provide a vacuum output as a function of the ambient temperature of an active bimetal element. In other words, when the vacuum regulator is in a condition of equilibrium vacuum and vent valves are closed so that vacuum is conserved. The bimetal element is designed as a simple beam pivoted at the center. Motion of the beam is constrained at one end by a support which can be adjusted in accordance with the desired temperature. The opposite end of the bimetal element is in contact with a whiffle tree beam which is free to move as the bimetal element deflects as a function of temperature or temperature setting. To minimize system hysteresis, the bimetal element and whiffle tree beam are preloaded by a helical compression spring which maintains the load on the bimetal element and whiffle tree beam attachment point in one direction. Hysteresis as a result of play at the pivots is thereby eliminated. The helical compression spring is suitably designed with a relatively low spring rate so that the force applied to the whiffle tree beam is relatively constant throughout the normally expected deflection range. Two needle valves are attached to the whiffle tree beam with unidirectional spherical bearings. The needle valves are maintained in zero play connection to the whiffle tree beam by magnetic attraction, the whiffle tree beam being suitably of steel and the needle valves being magnetized steel. The vacuum valve is located at the end of the whiffle tree beam remote from the attachment point of the bimetal of the whiffle tree beam. The vacuum valve controls the input vacuum flow into a regulated vacuum chamber. The vacuum valve seat is fixed. The vent valve is located centrally on the whiffle tree beam with the vent valve seat being positioned on a feedback piston comprised of a flexible diaphragm which forms one wall of the controlled vacuum chamber. There is thus present on one side of the feedback piston the controlled vacuum and on the other side ambient air. The location of the piston is thus determined by the controlled vacuum and a feedback leaf spring which normally biases the feedback piston upward.

The bimetal element is arranged in a stream of air whose temperature is to be controlled so that the resultant controlled vacuum is related to the temperature of the air stream and an adjustable force which can be applied to the bimetal element and which is related to a selected desired temperature.

When the vacuum regulator is in equilibrium the feedback piston assumes a position such that both the vent valve and the vacuum valve are closed. In this equilibrium condition there is no air bled into the vacuum regulator, hence there is no waste of engine vacuum.

In an alternative embodiment, one of the vacuum or vent valves is replaced by an orifice whereby engine vacuum or ambient air respectively is continuously communicated with the regulated vacuum chamber and the valve controlled to regulate the vacuum therein.

It is an object of this invention to provide a vacuum regulator which operates on thermomechanical principles.

It is another object of this invention to provide a vacuum regulator of the type described which is particularly adapted for use in an automotive automatic temperature control system.

It is a further object of this invention to provide a thermomechanical vacuum regulator, particularly for use in automotive vehicles which provides a controlled vacuum for controlling an automatic temperature control system in response to actual temperature and desired temperature.

It is another object of this invention to provide a vacuum regulator of the type described which includes a thermally responsive mechanical element which acts through valve means for controlling vacuum within a chamber and wherein the forces exerted by said mechanical element are minimal.

DESCRIPTION OF THE PREFERRED EMBODIMENT

Figures 1, 2:
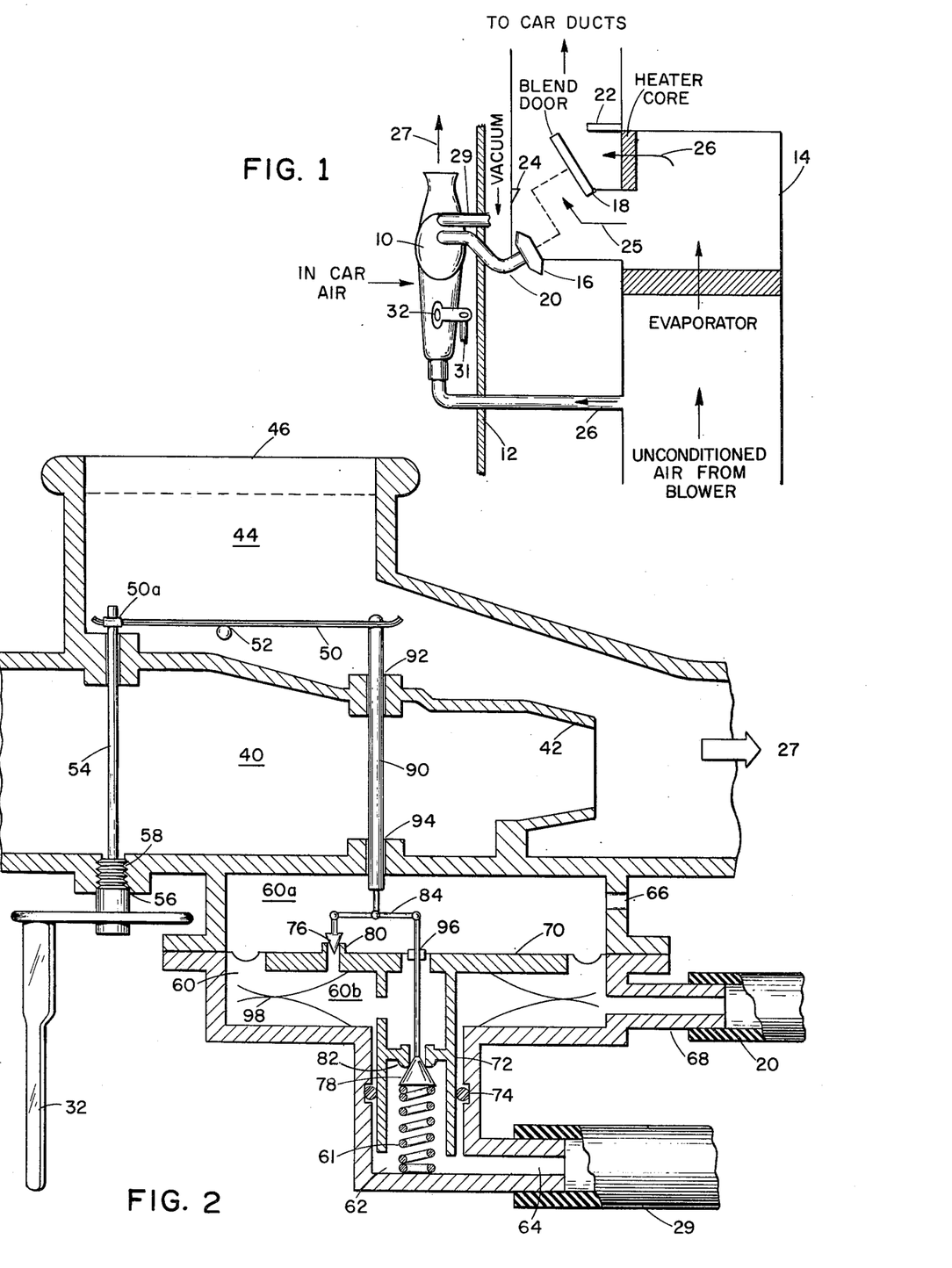
FIG. 1 is an illustrative schematic representation of a portion of a motor vehicle automatic temperature control system constructed in accordance with this invention.
FIG. 2 is a schematic side view of a vacuum regulator built in accordance with the principles of this invention, cut away to show the operation of its interior parts.

Referring now to the figures wherein like elements are numbered alike and particularly referring to FIG. 1, there is seen a vacuum regulator 10 mounted on the passenger compartment side of an automobile fire wall 12. Located optionally exterior to the passenger compartment is duct work 14 which receives unconditioned air from a blower (not shown). The air is conditioned within the duct work and delivered to the car ducts, suitably either the air conditioning ducts, the heater ducts or the defroster ducts. The unconditioned air from the blower passes through an air conditioning evaporator, if such is provided. A blend door pivoted at axle 18 is controlled by a vacuum motor 16 which receives a controlled vacuum via tubing 20 from vacuum regulator 10. As will be explained below, the position of the blend door is in accordance with the operation of vacuum regulator 10. The blend door suitably can be positioned against stop 22 or against stop 24, pivoting on axle 18, or suitably at any position intermediate thereof. If the blend door is against stop 24 then all the air passes through a heater core, following arrow 26. If this vehicle is provided with air conditioning and particularly an air conditioning evaporator and the air conditioning is energized, the operation of the automatic temperature control system in this condition is somewhat like that of a dehumidifier where the unconditioned air is cooled and dehumified by the evaporator and then reheated in the heater core before delivery to the passenger compartment. If no air conditioning unit is provided or if the air conditioning is turned off then the air is simply heated.

With the blend door against stop 22 no air can pass through the heater but rather follows the path of arrow 25 to the car ducts and eventually into the passenger compartment. In this condition, of course, no heating of the unconditioned air occurs. With the blend door intermediate these two extreme positions, a portion of the air will follow the course of arrow 25 while another portion will follow the course of arrow 26 through the heater core, to thus produce a mixture of unheated and heated air downstream from the blend door. The ratio of this mixture is, of course, dependent upon the specific position of the blend door, the percentage of heated air being less as the blend door approaches stop 22 and being more as the blend door approaches stop 24.

A conduit 26 permits a small portion of the unconditioned air to be delivered to the vacuum regulator 10 for the purposes to be described below. An aspirator within the vacuum regulator and which will be seen in greater detail in FIGS. 2 and 3 receives the air from conduit 26 and causes a small portion of in-car air to be drawn into the vacuum regulator. This air is exhausted from the vacuum regulator, as indicated by arrow 27, into the passenger compartment. The use of this air, while within vacuum regulator 10, will be explained below.

The vacuum regulator 10 receives raw vacuum, suitably from the engine manifold, via a conduit 29. The set point, that is the desired in-car temperature setting, is set into the vacuum regulator suitably via a flexible cable 31, attached to a bell crank 32. Flexible cable 31 is shown cut away, however, it should be understood that the end not shown is suitably connected to controls on a dashboard for manipulation by the vehicle operator.

Refer now to FIG. 2 which shows a form of vacuum regulator 10 in side elevation cut away to show its interior parts. An aspirator 40 receives unconditioned air from conduit 26, previously seen in FIG. 1, which unconditioned air passes through venturi nozzle 42. In the manner well known to those skilled in the art, the air being expelled from the venturi nozzle 42 will create a low pressure area so as to draw ambient air, in this case in-car air, through port 46 and through passageway 44 to be expelled together with the aspirated air from the vacuum regulator as indicated by arrow 27 seen here and also seen in FIG. 1. By this operation, in-car air is drawn over a bimetal element 50 which is freely pivoted at fulcrum 52. One end 50a of the bimetal element 50 is biased about pivot 52 by rod 54 which is integral with screw 58. Screw 58 is received in tapped hole 56 so that rotation thereof causes rod 54 to move up or down carrying with it end 50a of bimetal element 50. A bell crank 32 is connected to screw 56 and adapted to cause rotation thereof whereby end 50a of bimetal element 50 is positioned in accordance with the desired air temperature. It should be understood that bell crank 32 is connected by the flexible cable 31 seen in FIG. 1 to controls which may be manipulated by a vehicle operator.

The vacuum regulator includes an internal chamber 60 which is suitably of cylindrical shape, divided into two smaller chambers 60a and 60b by a feedback diaphragm or piston 70. Chamber 60 has dependent therefrom a smaller cylindrical chamber 62 which is generally coaxial therewith, chamber 62 being terminated by port 64 which is normally communicated directly with a source of vacuum, such as engine manifold vacuum.

Feedback piston 70 has dependent therefrom a cylindrical section 72 which freely fits within cylindrical chamber 62.

The portion of chamber 60 above piston 70, chamber 60a, communicates directly with ambient air through, for example, port 66. The portion of chamber 60 below piston 70, chamber 60b, communicates with a port 68 which is adapted to communicate through tube 20 with vacuum motor 16 seen in FIG. 1. Chamber 60b can also communicate with ambient air through vent valve 76 and with engine manifold vacuum through vacuum valve 78. Vent valve 76 cooperates with valve seat 80 located in the vacuum feedback piston while vacuum valve 78 cooperates with valve seat 82 located in the dependent portion 72 of the vacuum feedback piston. Dependent portion 72 is also sealed within chamber 62 by means such as O-ring 74 to thus prevent raw vacuum from communicating with chamber 60b when valve 78 is closed. It should be understood that sealing means 74 does not substantially hinder the free movement of dependent portion 72 within chamber 62. Valves 76 and 78 are respectively and pivotedly connected to the opposite ends of whiffle tree beam 84, whose center is pivotedly connected to one end of rod 90 whose other end is connected to bimetal element 50. Rod 90 is freely guided by bearings 92 and 94 located in the walls of aspirator 40.

It will be noted that valve 78 passes through vacuum feedback plunger 70 at vacuum seal 96. It should be understood that vacuum seal 96 provides substantially no resistance to relative longitudinal movement of valve 78 with respect to vacuum feedback piston 70.

A double leaf spring 98 is provided within chamber 60b for biasing vacuum feedback piston 70 in an upward direction.

Assuming that port 68 is connected as previously described to a vacuum motor or alternately closed, the vacuum regulator of FIG. 2 is shown in its normal or equilibrium condition. In this condition, valves 76 and 78 are both closed. Assume now that bimetal element 50 exerts a downward force on rod 90. This may occur, for example, by the cooling of the air passing over the bimetal element or, as another example, by the rotation of screw 58 in the direction to cause end 50a of bimetal 50 to move in an upward direction. With rod 90 moving in a down direction, whiffle tree beam 84 will pivot about valve 76 as a fulcrum so as to depress valve 78 against spring 61, so that the vacuum valve is opened to permit vacuum to communicate with chamber 60b. This, of course, causes the vacuum within chamber 60b to increase and in response thereto vacuum feedback piston 70 moves downward carrying with it valve 76 and valve seat 82 so that eventually a new equilibrium condition is established where valves 76 and 78 are both closed and vacuum feedback diaphragm 70 has been displaced downward somewhat. Note that due to the pivoting action of whiffle tree beam 84 only negligible reaction force is exerted on bimetal element 50.

Assume now that bimetal element 50 exerts an upward force on rod 90. This can occur, for example, by a heating of the air passing over bimetal element 50 or by manipulation of rod 54 so as to apply a downward force to end 50a of the bimetal element. When rod 90 moves upward the whiffle tree beam 84 pivots about valve 78 as a fulcrum so that valve 76 is opened. Ambient air thus enters chamber 60b decreasing the vacuum therein to thus cause vacuum feedback plunger 70 to move upward into a new equilibrium position whereby valve 76 is again closed. Again, only negligible reaction forces are exerted on bimetal element 50. Of course, this new equilibrium condition corresponds to a new vacuum level within chamber 60b.

Figure 3:
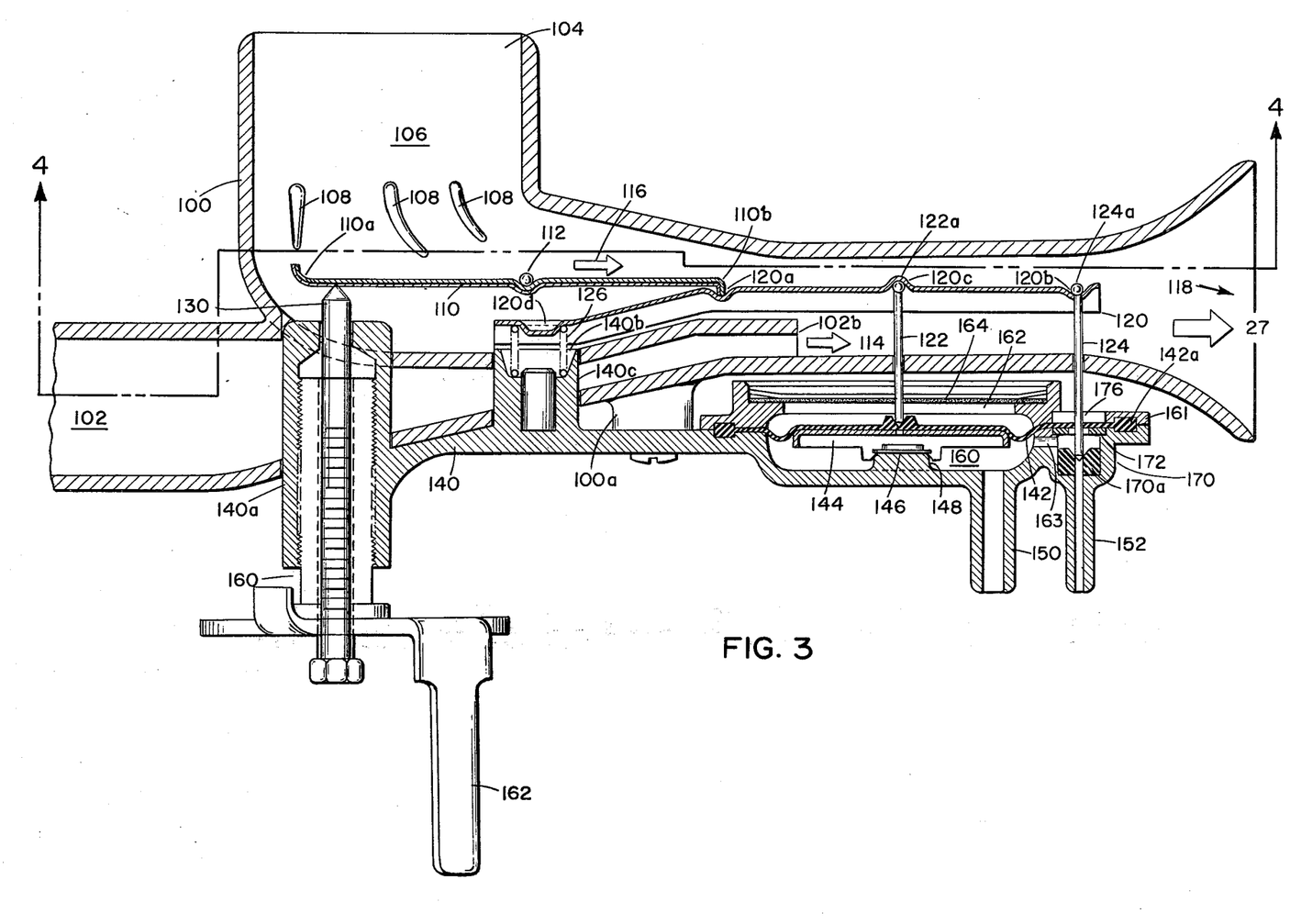
FIG. 3 is a side view of another form of vacuum regulator built in accordance with the principles of this invention and also cut away to show the operation of its interior parts.
Figures 4, 5:
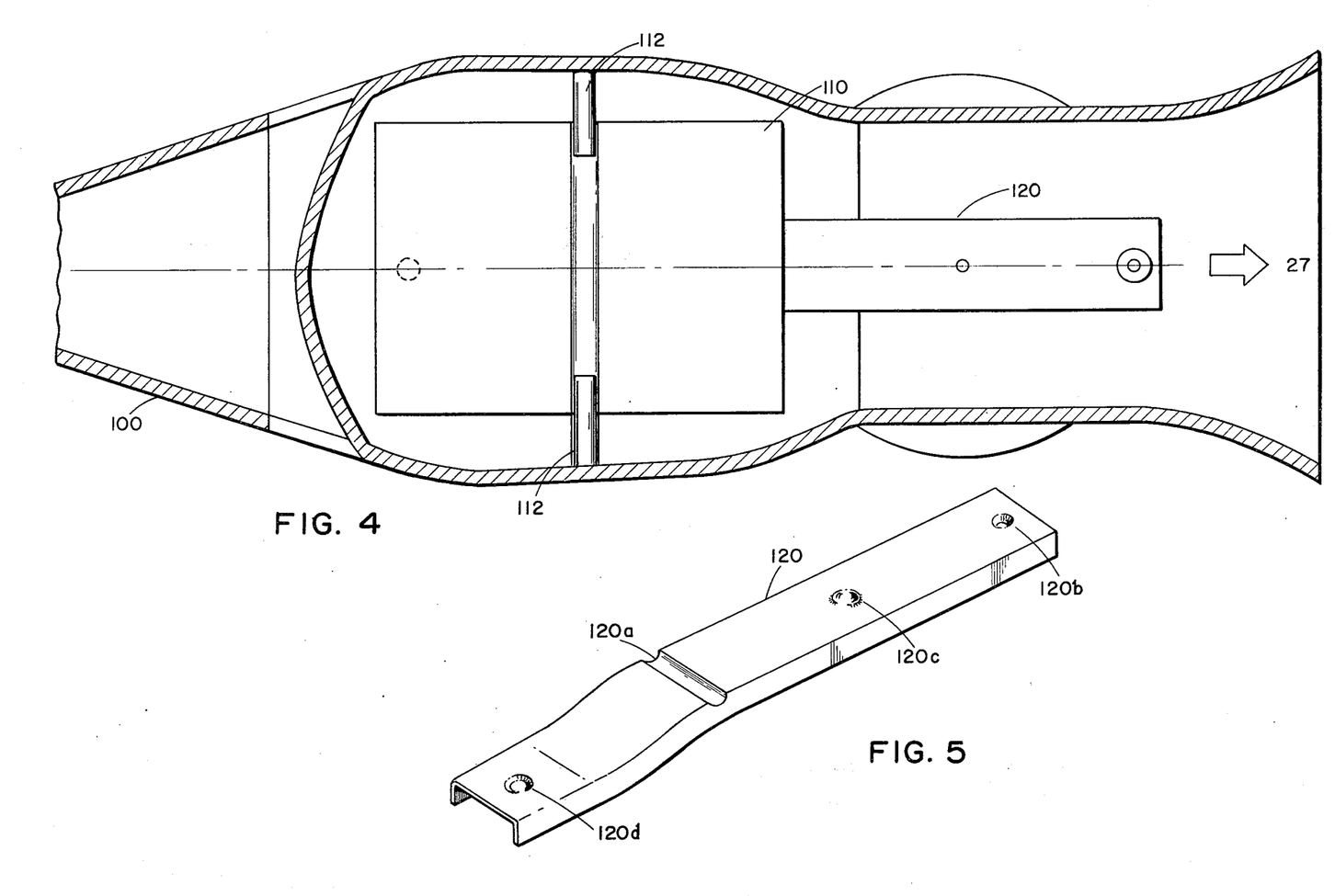
FIG. 4 is a plan view of the regulator of FIG. 3 cut away at line 4—4.
FIG. 5 is an oblique view of the whiffle tree beam of FIG. 3.
Figures 6, 7:
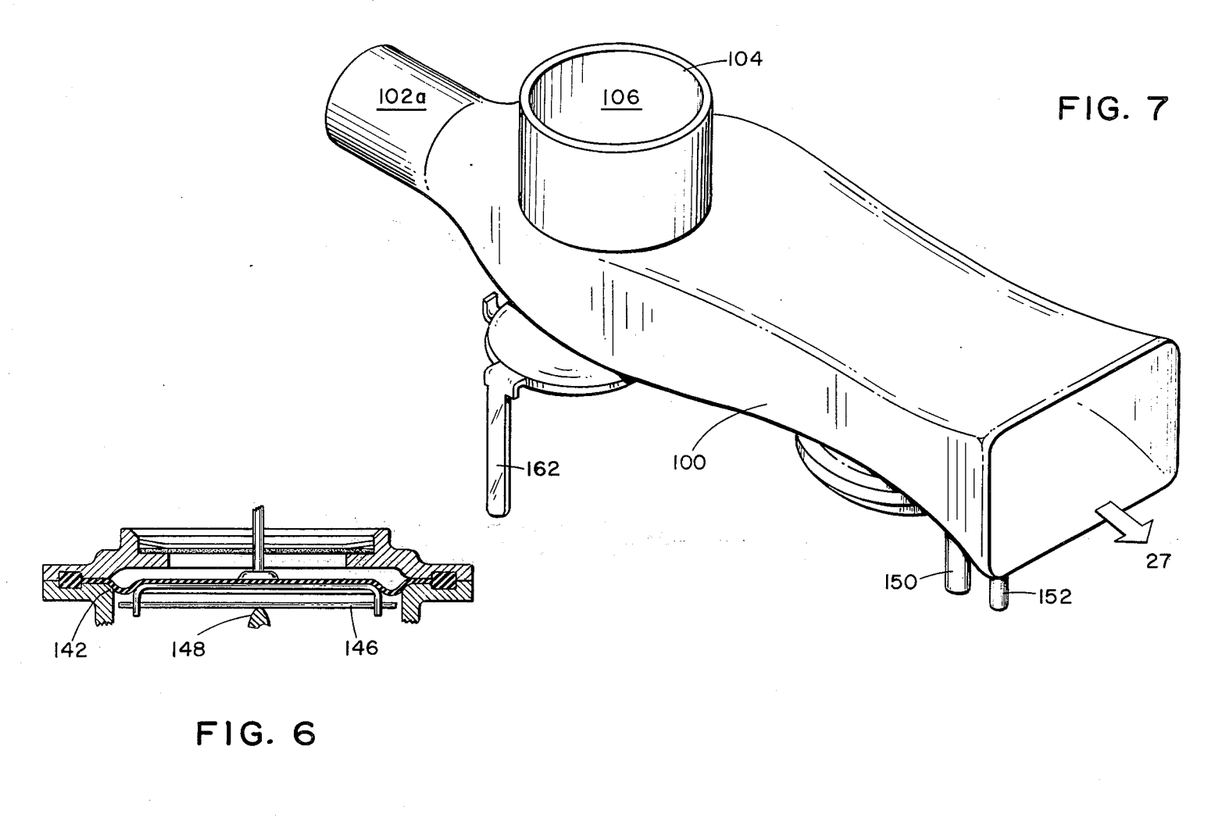
FIG. 6 shows an end view of the feedback piston of FIG. 3.
FIG. 7 is an oblique view of the vacuum regulator of FIG. 3.

Refer now to FIGS. 3 and 4 which show respectively another form of the invention in cut-away side and plan views and also to FIG. 7 which shows an oblique exterior view of the same form of the invention. A vacuum regulator is comprised of a body 100 having a passage 102 whose end 102a (FIG. 7) is adapted to receive air from the vehicle blower via, for example, tubing 26 of FIG. 1. Air is expelled from passage 102 at venturi nozzle 102b in the direction of arrow 114. In the manner well known to those skilled in the art, the air being expelled from venturi nozzle 102b will create a low pressure area so as to draw ambient air, in this case in-car air, through port 104 and passageway 106 and represented by arrow 116. The air represented by arrows 114 and 116 is mixed in the nozzle 118 and expelled from the regulator in the direction of arrow 27. By this operation in-car air is drawn over a bimetal strip or element 110, being directed upon the bimetal strip by vanes 108 which are preferably cast as part of body 100.

The bimetal element 110 is freely pivoted at pivot points 112, which are supported by body 100. An end 110a of bimetal element 110 is supported by an adjustable pin 130, more of which will be mentioned below. The other end, 110b, of bimetal element 110 is downturned to fit into groove 120a of a whiffle tree beam 120, which is seen in greater detail at FIG. 5, reference to which figure should now also be made. The whiffle tree beam 120 is comprised of a channel shaped piece of sheet metal for rigidity and has a holed dimple 120b at the one end thereof adapted to receive the spherical end 124a of vacuum needle valve 124 with spherical end 124a being above the whiffle tree beam 124 dependent therefrom through the hole in dimple 120b. A dimple 120c located approximately midway between groove 120a and dimple 120b is adapted to receive the spherical end 122a of vent needle valve 122. As previously mentioned, the needle valves 120 and 122 are preferably magnetized steel while the whiffle tree beam is preferably steel. The magnetic attraction between the valves and the whiffle tree beam results in zero play therebetween. A compression helical spring 126 cooperates with dimple 120d on the whiffle tree beam to bias the whiffle beam in an upward direction into contact with bimetal element 110 at groove 120a.

Pin 130 is carried by a structural element 140 which also carries a feedback diaphragm 142. Element 140 is fastened to body 100, for example, through boss 100a which is integral with the body. Pin 130 is threadably received by a sleeve 160 which in turn is threadably received by an enlarged end 140a of element 140. End 140a protrudes through the wall of body 100 as shown so as to permit the end of pin 130 to bear against bimetal element 110. A sleeve 160 is fixedly attached to a bell crank 162. The bell crank is adapted to be attached to a flexible cable, as explained with respect to FIG. 1, through which adjustments can be made to bimetal element 110. For initial setup and calibration bell crank 162 is locked relative to end 140a and initial adjustment made by rotating pin 130 relative to sleeve 160. Thereafter, bell crank 162 and sleeve 160 are locked to pin 130 by means not shown, but which will be obvious to one skilled in the art so that subsequent rotation of the bell crank rotates the sleeve 160 within its threaded bore to effect movement of pin 130 along its longitudinal axis to thereby adjust bimetal element 110.

Element 140 includes an additional boss 140c which protrudes through the wall of housing 100 and has a cup-shaped depression 140b therein for supporting one end of spring 126.

Element 140 also includes ports 150 and 152 which are adapted respectively for communicating with a vacuum motor and a source of vacuum. Port 150 communicates directly with a chamber 160 located beneath diaphragm 142. Diaphragm 142 is suitably an elastomer material having an enlarged periphery 142a which acts as an O-ring cooperating with element 140 and upper structural element 161 to hermetically seal chamber 160. The diaphragm is held in place by upper element 161 as shown, which has a large bore therein to freely communicate the top of the diaphragm through air filter material 164 to ambient air. The filter material prevents dirt and other foreign matter from falling on the diaphragm. A cup-shaped support member 144 underlies the diaphragm and has a centrally located hole therein underlying a like hold in the center of diaphragm 142. This hole comprises the valve seat for valve 122. Spring 146 resting on boss 148 applies upward bias to underlying plate 144 and hence diaphragm 142. Diaphragm 142 together with spring 146 and boss 148 are seen in end view at FIG. 6, reference to which figure should now also be made and wherein the function and the operation of spring 146 can be better seen.

Port 152 terminates in valve recess 170 which retains rubber valve seat 170a which cooperates with valve 124 to communicate the vacuum source with chamber 160 through passage 163 when valve 124 is open. As can be seen, the valve stem passes through a small hole in the diaphragm, the diaphragm material forming a type of seal about the valve stem. The valve stem also passes through washer 172 which underlies the diaphragm and forms support therefor at the entry point of the valve stem. As an alternative a ferro magnetic fluid and activating permanent magnet can be disposed about the valve stem in counterbore 176 to effect a seal in the diaphragm while still permitting the valve stem to pass freely therethrough.

In a vacuum regulator actually built in accordance with FIGS. 3, 4, 5, 6 and 7 the bimetal element 110 was initially adjusted by manipulation of pin 130 so that at 55° F the bimetal element positions the whiffle tree beam to close both the vacuum valve and vent valve with zero vacuum output, that is zero vacuum in chamber 160. In this condition the whiffle tree beam is stabilized by a three point contact, that is at end 120d by spring 126, in groove 120a by the bimetal element 110 and in dimple 120c by valve 122. Assume now that the ambient temperature of the air impinging on bimetal element 110 is raised to 70° F. This causes the right hand side of the bimetal element to deflect downward rotating the whiffle tree beam about the center line of the spherical joint on vent valve 122. This causes vacuum valve 124 to be lifted and opened an amount approximately equal to the deflection of the bimetal element. Opening of the vacuum valve allows the output vacuum, that is the vacuum in chamber 160, to increase and thereby displace the feedback piston comprised of diaphragm 142 downward. As the feedback piston deflects downward the whiffle tree beam center of rotation is transferred to its contact point with the bimetal element, that is at groove 120a. Rotation of the whiffle tree beam about the bimetal element contact point carries with it the closed vent valve 122 and the open vacuum valve 124 until the vacuum is closed. The system is now at a new equilibrium point with the vacuum in chamber 160 at a level corresponding with a bimetal element temperature of 70° F.

Assume now that the temperature of the air impinging on bimetal element 110 drops to 65° F. This causes the right side of bimetal element 110 to deflect upward which in turn causes the whiffle tree beam to deflect upward and pivot about the normally closed vacuum valve 124. The vent valve 122 is thereby opened, allowing chamber 160 to vent, decreasing the vacuum therein. In response thereto the feedback piston is deflected upward until vent valve 122 is closed, at which time the system is at a new equilibrium point with the vacuum in chamber 160 corresponding to the new temperature of bimetal element 110.

Note particularly that the reaction forces exerted on the bimetal element are negligible.

The teachings of this invention suggest certain alternate embodiments of the invention. For example, one of the vent or vacuum valves can be replaced by an orifice to continuously communicate chamber 160 (referring again to FIG. 3) with ambient air of the vacuum source respectively. In any event, a column or rod equivalent to the replaced valve stem would be present in the alternative embodiment to aid in supporting the whiffle tree beam. As a first example of such an alternative embodiment assume that the vacuum valve is eliminated and that the vacuum source is communicated to chamber 160 through an orifice. This can be accomplished by eliminating the lower end of valve 124, that is the portion below washer 172, and affixing valve 124 to the washer so that valve 124 now comprises a fixed column aiding in the support of whiffle tree beam 120. In addition, the passage in valve seat 170a now becomes an orifice, which preferably is designed to be smaller in cross sectional area than when the passage is to be restricted by a value. In this case the equilibrium position of the device, corresponding to a certain vacuum level in chamber 160, will be with the diaphragm biased downward, away from the vent valve, due to the vacuum in chamber 160, thereby opening the vent valve just enough to maintain the vacuum level in chamber 160 constant.

As a second example of a further alternative embodiment, assume that the vent valve is eliminated and atmospheric air is communicated continuously to chamber 160. This can be accomplished by sealing valve 122 into its valve seat on diaphragm 142. This causes stem 122 to now become a push rod follower for whiffle tree beam 120 and which follows the motion of the diaphragm. In addition, an orifice (not shown) is provided through diaphragm 142 to cause a continuous air bleed. In this latest example the equilibrium position of the device, again corresponding to a certain vacuum level in chamber 160, will be the diaphragm biased upward, thereby pivoting whiffle tree beam 120 about groove 120a so as to cause the vacuum value to be held open just enough to maintain the vacuum level in chamber 160 constant.

The embodiment of FIG. 1 contemplates a number of possible uses of the invention. For example, it is possible that the automatic temperature control system shown could be used without an air cooling mechanism as previously described. In that case, the unconditioned air will not be cooled to depress the air temperature below ambient air temperature. However, it will be possible to operate the system as an air heater wherein the amount of heating is controlled. It would also be possible with or without an air cooler to provide some sort of mixing means down stream to provide for optional recirculation of the air within the passenger compartment or for addition of fresh outside air. It is also possible to place the evaporator up stream from the blend door. However, this is not desirable since this would not permit the degree of air dehumidification that is possible with the illustrated embodiment. It is, of course, also possible to use the vacuum regulator of this invention and to provide other means for controlling the speed of the blower and for controlling other functions of the automatic temperature control system if a more sophisticated automatic temperature control system is desired. It is also possible to use the vacuum regulator of this invention for other uses than automatic temperature control systems. In any event, alterations and modifications of the invention being obvious to one skilled in the art, the invention is to be limited only by the true scope and spirit of the appended claims.

The invention claimed is:

1. A vacuum regulator for producing a controlled vacuum related to the deviation of an actual temperature from a selected temperature comprising:
   a source of vacuum;
   a first pressure source;
   a chamber, the vacuum within which comprises said controlled vacuum;
   first valve means for communicating said chamber with said pressure source when open;
   second valve means for communicating said chamber with said source of vacuum when open;
   a beam having at least three approximately colinear spaced apart pivots, said first valve means cooperating with said beam at a first pivot and said second valve means cooperating with said beam at a second pivot to open and close said valve means, said beam having an equilibrium condition wherein said first and second valve means are closed;
   bimetal means responsive to temperatures higher than said selected temperature and cooperating with said beam at a third pivot for urging said beam into a second condition to open one of said valve means while maintaining the other of said valve means closed, and responsive to temperatures lower than said selected temperature for urging said beam into a third condition to open the other of said valve means while maintaining said one of said valve means closed; and,
   a vacuum feedback diaphragm means comprising at least a portion of at least one of said first and second valve means and responsive to pressure difference thereacross for displacing said diaphragm means and cooperating through at least one of said first and second valve means with said beam to return to said equilibrium condition, one side of said diaphragm means being communicated with said chamber and the other side of said diaphragm means being communicated with a second pressure source.

2. The vacuum regulator of claim 1 wherein said first and second pressure sources are identical.

3. The device of claim 1 wherein said bimetal means comprises a bimetal element and means for biasing said beam into intimate contact with said bimetal element at a first position on said beam.

4. The device of claim 3 wherein said second valve means includes a second valve seat and a second valve stem pivotedly attached to said beam at a second position thereon and dependent therefrom to cooperate with said second valve seat, and wherein said first valve means includes a first valve seat and a first valve stem pivotedly attached to said beam at a position about midway between said first and second positions, and dependent therefrom to cooperate with said first valve seat.

5. The device of claim 3 wherein said second valve means includes a second valve seat and a second valve stem pivotedly attached to said beam at a second position thereon and dependent therefrom to cooperate with said second valve seat, and wherein said first valve means includes a first valve seat and a first valve stem pivotedly attached to said beam at a third position and dependent therefrom to cooperate with said first seat, one of the positions being about midway between the other two positions.

6. The device of claim 5 wherein said first valve seat is carried on said diaphragm means.

7. The device of claim 6 with additionally:
   a source of ambient air at a first temperature;
   means for passing said ambient air over said bimetal element; and,
   means responsive to said controlled vacuum for altering the temperature of said ambient air.

8. The device of claim 7 wherein said ambient air comprises said first and second pressure sources.

9. Pressure regulator means for use in a control system wherein temperature of a fluid stream is regulated in response to a controlled fluid pressure comprising:
   a first pressure fluid source;
   a second pressure fluid source for providing a fluid having a pressure different than that provided by said first pressure fluid source;
   a chamber, the fluid pressure within which comprises said controlled fluid pressure,
   thermomechanical means responsive to the temperature of the fluid stream whose temperature is to be regulated for generating a force along a first line of action;
   valve means for regulating the ratio of the flow rate of fluid between one of said first and second pressure fluid sources and said chamber with respect to the flow of fluid between said chamber and the other of said first and second pressure fluid sources, whereby the fluid pressure within said chamber is regulated;
   support means;
   a beam pivotally supported by said support means at a first location thereon and cooperating with said thermomechanical means along said first line of action so as to pivot said beam about said first location in response to said force generated by said thermomechanical means along said first line of action, said first line of action intersecting said beam at a second location thereon, said beam being cooperative with said valve means along a second line of action to urge said valve means to regulate said ratio, and;
   feedback means comprising a diaphragm forming at least a portion of the walls of said chamber, the outside surface of said diaphragm being communicated with one of said first or second pressure fluid sources for additionally urging said valve means to regulate said ratio, one of said support means and said valve means being carried on said diaphragm.

10. Pressure regulator means as recited in claim 9 wherein at least a portion of said valve means is carried on said diaphragm.

11. Pressure regulator means as recited in claim 9 wherein said valve means comprises at least one valve seat cooperating with at least one valve, one of said valve seat or valve being carried on said diaphragm.

12. Pressure regulator means as recited in claim 9 wherein one of said pressure fluid sources comprises atmospheric air and the other pressure fluid source comprises a vacuum source.

13. Pressure regulator means as recited in claim 9 wherein said support means comprises a push rod connecting said diaphragm to said beam for conveying motion of said diaphragm to said beam along a third line of action generally parallel to said first and second lines of action, one end of said push rod comprising said first location.

14. Pressure regulator means as recited in claim 13 wherein one of said pressure fluid sources comprises atmospheric air and the other pressure fluid source comprises a vacuum source, said valve means comprising an orifice for communicating said chamber with said atmospheric air and a valve operable along said second line of action for providing throttled communication between said chamber of said vacuum source.

* * * * *